US011422959B1

(12) United States Patent
Tsirkin

(10) Patent No.: US 11,422,959 B1
(45) Date of Patent: Aug. 23, 2022

(54) SYSTEM TO USE DESCRIPTOR RINGS FOR I/O COMMUNICATION

(71) Applicant: Red Hat, Inc., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/185,294

(22) Filed: Feb. 25, 2021

(51) Int. Cl.
*G06F 13/20* (2006.01)
*G06F 9/455* (2018.01)
*G06F 13/42* (2006.01)

(52) U.S. Cl.
CPC .......... *G06F 13/20* (2013.01); *G06F 9/45558* (2013.01); *G06F 13/4282* (2013.01); *G06F 2009/45579* (2013.01); *G06F 2213/0026* (2013.01)

(58) Field of Classification Search
CPC .............. G06F 3/00; G06F 9/00; G06F 13/22
See application file for complete search history.

(56) References Cited

U.S. PATENT DOCUMENTS

| 8,874,802 | B2 | 10/2014 | Thakkar |
| 9,875,131 | B2 | 1/2018 | Tsirkin et al. |
| 10,152,275 | B1 | 12/2018 | Tsirkin |
| 10,545,697 | B1 | 1/2020 | Tsirkin |
| 2013/0055259 | A1 | 2/2013 | Dong |

FOREIGN PATENT DOCUMENTS

CN 107643986 11/2020

OTHER PUBLICATIONS

Xu et al., SRVM: Hypervisor Support for Live Migration with Passthrough SR-IOV Network Devices, Vmware Inc, Apr. 2-3, 2016, VEE'16, 13 pages.

*Primary Examiner* — Getente A Yimer
(74) *Attorney, Agent, or Firm* — Lowenstein Sandler LLP

(57) ABSTRACT

A system and method for input/output communication is disclosed. In one embodiment, a virtual device identifies a queue including a plurality of input/output (I/O) descriptors, each of the plurality of I/O descriptors representing one of: an active descriptor associated with an active I/O request or an executed descriptor that is associated with an executed I/O request. The virtual device retrieves, from a first index in the queue, one or more active descriptors associated with an I/O request. The virtual device executes the I/O request. The virtual device writes a first executed descriptor to a second index in the queue, where the first executed descriptor indicates the I/O request has been executed. The virtual device updates the second index to an initial position in the queue responsive to a predetermined condition.

20 Claims, 10 Drawing Sheets

SYSTEM TO USE DESCRIPTOR RINGS FOR I/O COMMUNICATION

TECHNICAL FIELD

This disclosure relates to computer systems, and more particularly, to a virtualized computer system that uses descriptor rings for input/output (IO) communication between a driver and a device.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual devices," each of which maps, typically in a one-to-one fashion, to a physical device of the host machine (e.g., a network interface device, a storage device, etc.). The hypervisor typically manages these mappings in a transparent fashion, thereby enabling the guest operating system and applications executing on the virtual machine to interact with the virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
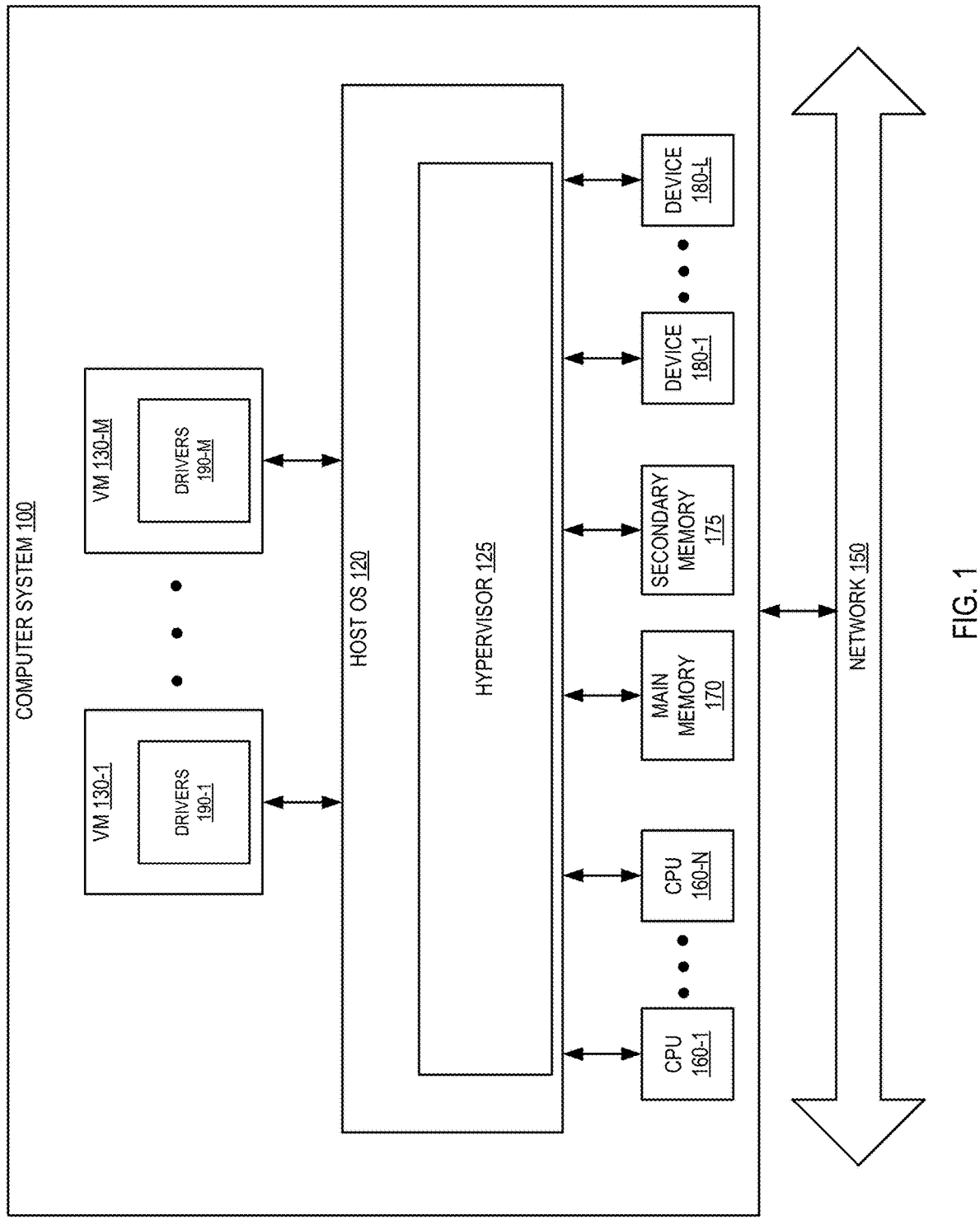
FIG. 1 depicts an example of a computer system according to one embodiment.

Described herein is a system and method directed to driver/device communication using descriptor rings. A descriptor ring refers to a memory buffer that a driver uses to communicate with a physical input/output (I/O) device. In particular, the driver accesses the physical device via a virtual device. The virtual device is implemented by a hypervisor that corresponds to an underlying hardware device. "Driver" refers to a software module that enables a guest operating system in a virtual machine to communicate with the hardware device.

In one implementation, a single queue (ring structure) is used for driver/virtual device communication. The queue can be a continuous block of memory in the guest OS of a predefined length. Descriptors are written to the queue by both the driver and the virtual device from the head of the queue to the tail of the queue, in an orderly manner. Both the driver and the virtual device can store local copies of a first index and a second index. The driver can use the first index (active_idx) to point to the queue position where the driver is writing in the queue. The virtual device can use the second index (executed_idx) to traverse the position where the virtual device is writing in the queue. The virtual device can monitor the queue for new active descriptors to appear at the queue position referenced by the first index (active_idx). The driver can monitor the queue for new executed descriptors to appear at the queue position referenced by the second index (executed_idx). These indices are incremented, respectively, after each write operation. When the last element of the memory buffer holding the queue is reached by an index, the index wraps around the last element, i.e., is reset to reference the first element of the buffer. The descriptors can be active descriptors or executed descriptors. Active descriptors reference the data written by a driver to the virtual device. An active descriptor can represent data for a buffered request to execute some operation (store packet, send packet, etc.) by the corresponding physical device. The virtual device can write executed descriptors to the same queue (overwriting the active descriptors) to indicate that the request corresponding to the active descriptors have been executed. Both the device and the driver should prevent overwriting active descriptors by executed descriptors before these active descriptors can be processed and/or overwriting executed descriptors by active descriptors before these executed descriptors can be processed.

Accordingly, in one example, when the virtual device completes a request corresponding to two or more active descriptors, the virtual device can write two or more (e.g., repeats) executed descriptors in the queue. In another example, the virtual device writes one executed descriptor and keeps some elements in the queue empty (e.g., skips), to keep the number of active descriptors for a request and the number of would-be executed descriptors for the equal to be equal, e.g., in sync.

However, repeating the executed descriptors can cause an overhead when the virtual device writes the repeated executed descriptors to the queue. A queue with skipped descriptors (e.g., non-continuous blocks of memory) can lead to many smaller writes on a communication bus when the driver communicates the descriptors to the virtual device (8-16 bytes for each descriptor). The small writes, each appended with a header, can cause a large transfer bandwidth overhead, especially for PCI-Express (PCIe) data transfers where each packet is about 256 bytes. At the worst case, each smaller write can cause a PCIe packet to be sent.

The present disclosure addresses the above-noted and other deficiencies of various implementations by implementing a single descriptor ring for driver-to-virtual device and virtual device-to-driver communications. The driver writes active descriptors to the queue. The virtual device writes executed descriptors to the queue, one for each I/O request, continuously without repeating any executed descriptors. In other words, the virtual device writes one executed descriptors for a request having one or more active descriptors, regardless of the number of active descriptors for the request. These executed descriptors are adjacent to each other in the memory buffer, and the virtual device is thus capable of communicating the executed descriptors as one PCIE packet to reduce overhead.

FIG. 1 depicts an example of a computer system 100 according to one embodiment. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160, main memory 170, which may include volatile memory devices (e.g., random access memory (RAM)), non-volatile memory devices (e.g., flash memory), and/or other types of memory devices, secondary memory 175 (e.g., one or more hard disk drives, solid-state drives, etc.), and one or more devices 180 (e.g., a network interface device, USB drives, solid-state drives, a CD-ROM drive, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-M and that manages the execution of these virtual machines. It should be noted that in some alternative embodiments, hypervisor 125 may be external to host OS 120, rather than embedded within host OS 120.

Each virtual machine (VM) 130 is a software implementation of a machine that executes programs as though it were an actual physical machine. In addition, each virtual machine (VM) 130 has a driver 190. The virtual machine and the driver are described in more detail below with respect to FIG. 2.

Figure 2:
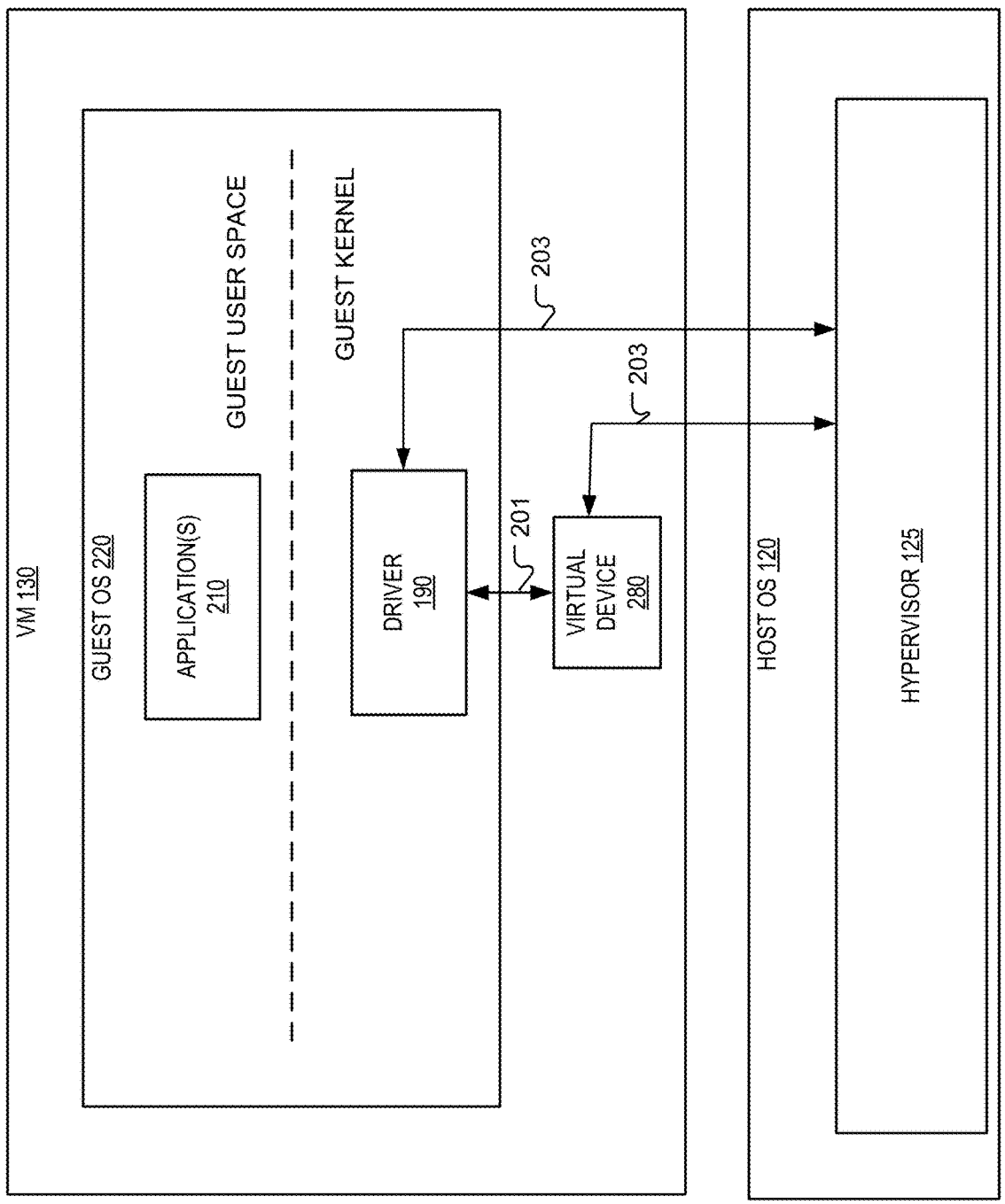
FIG. 2 depicts a block diagram of a virtual machine according to one embodiment.

FIG. 2 depicts a block diagram of a virtual machine (VM) 130 according to one embodiment. As shown in FIG. 2, virtual machine 130 comprises a guest operating system (OS) 220, virtual device 280, and driver 190.

Guest operating system (OS) 220 is software that manages computer resources and provides functions such as interprocess communications, scheduling, memory management, and so forth. Virtual device 280 is software that emulates a physical device and that maps to one of devices 180, for example, a PCI-Express storage device. In one embodiment, the mapping between virtual device 280 and device 180 is one-to-one, while in some other embodiments, virtual device 280 may map to more than one devices 180, and/or the mapping may not be one-to-one. In one embodiment, hypervisor 125 manages these mappings in a transparent fashion, so that guest OS 220 and applications 210 executing in a user space of virtual machine 130 can interact with virtual device 280 as though they were actual physical entities.

Driver 190 can include one or more files that enable device 180 to communicate with guest OS 220. Driver 190 allows VM 130 to send and receive data to and from device 180. Driver 190 can reside in guest OS kernel of guest OS 220. Driver 190 can communicate data (such as active/executed descriptors as shown further below) with virtual device 280 via data path 201. Driver 190 can further communicate control signals to virtual device 280 (such as interrupts or notifications) via control path 203.

Figure 3:
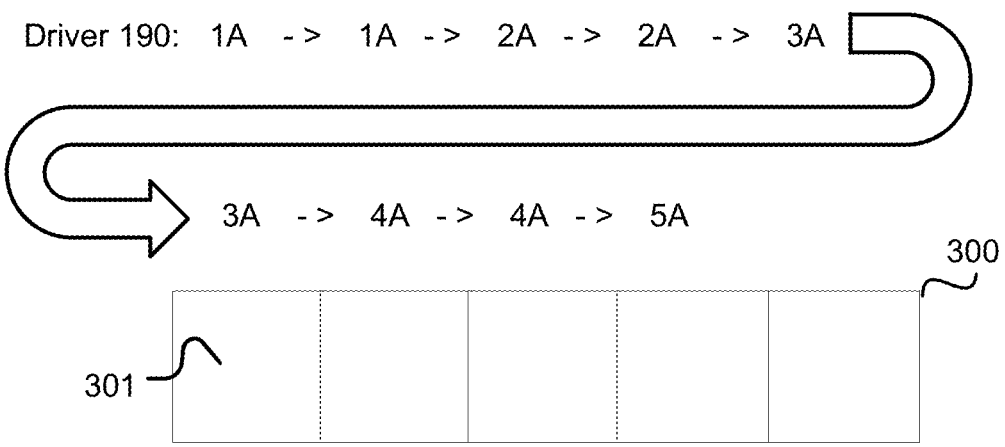
FIG. 3 depicts a block diagram of a descriptor ring structure 300 for driver—virtual device communication with repeated descriptors according to one embodiment.
Figure 3:
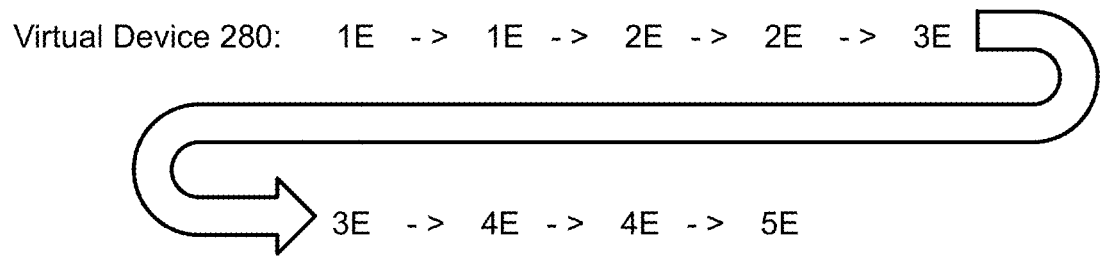

FIG. 3 depicts a block diagram of a descriptor ring structure for driver —virtual device communication according to one embodiment. Descriptor ring structure 300 can reside in a continuous memory buffer of a predetermined size. In one embodiment, driver 190 allocates the block of memory buffers within guest OS 220 (as part of main memory 170 of FIG. 1) for virtual device 280 to read/write to the memory buffers. E.g., the descriptor ring structure 300 is allocated by driver 190 for driver 190 to communicate data to virtual device 280. For example, if driver 190 has data to communicate to virtual device 280, driver 190 can prepare an active descriptor and store the data or reference to the data in the active descriptor. The active descriptor are placed in a queue in the ring structure 300 for virtual device 280 to process. Once some active descriptors are processed, virtual device 280 generates executed descriptor(s) and subsequently places the executed descriptor(s) in a queue in the same ring structure 300. Driver 190 can read the executed descriptor(s) from structure 300 to learn that the corresponding active descriptor(s) have been processed. Here, a descriptor can identify a data buffer that the driver uses to communicate with virtual device 280. A descriptor can be an active descriptor indicating the data buffer has not been processed by virtual device 280, or an executed descriptor indicating the data buffer has been processed by virtual device 280. For one example, a descriptor can contain a buffer identifier, an element address, an element length, and a flag. A buffer can include one or more physically-contiguous buffer elements. The buffer identifier can identify a buffer for a request. The element address is the physical address of a buffer element in the buffer. The element length is a length of the buffer element. The flag can be set to an active or an executed state to indicate whether the descriptor is an active descriptor or an executed descriptor. For ease of illustration, each descriptor in FIG. 3 only shows a number representing the sequential I/O request number for the descriptor, 'A' to denote an active descriptor, and 'E' to denote an executed descriptor.

As shown in FIG. 3, driver 190 can queue the active descriptors (1A-5A) for five requests in structure 300, in an orderly manner. For example, 1A's are active descriptors associated with a first I/O request, 2A's are associated with a second I/O request, 3A's are associated with a third I/O request, 4A's are associated with a fourth I/O request, and 5A is associated with a fifth I/O request. These active descriptors are queued in structure 300 (via active_idx) from a head to a tail of structure 300. When structure 300 is full, structure 300 wraps around and driver 190 writes the active descriptors again to the head of structure 300 from a head to a tail of structure 300.

Virtual device 280 can sequentially read the active descriptors from structure 300. Virtual device 280 can then process the active descriptors in the order that they are read. Once processed, virtual device 280 can generate executed descriptor(s) (1E-5E) corresponding to the active descriptors and place them in structure 300 from a head to a tail of structure 300. Virtual device 280 can use an index (executed_idx) to track where to write in structure 300. When the last element of structure 300 is reached by the index, the index wraps around and virtual device 280 writes the executed descriptors again sequentially from the head of structure 300. Because both active and executed descriptors are placed in structure 300, the active and executed descriptors have to be written in sync in order to prevent the descriptors from overwriting one another prior to them being read. FIG. 3 shows that virtual device 280 writes the executed descriptors to repeat the number of elements of their corresponding active descriptors to keep the active and executed descriptors in sync.

Figure 4:
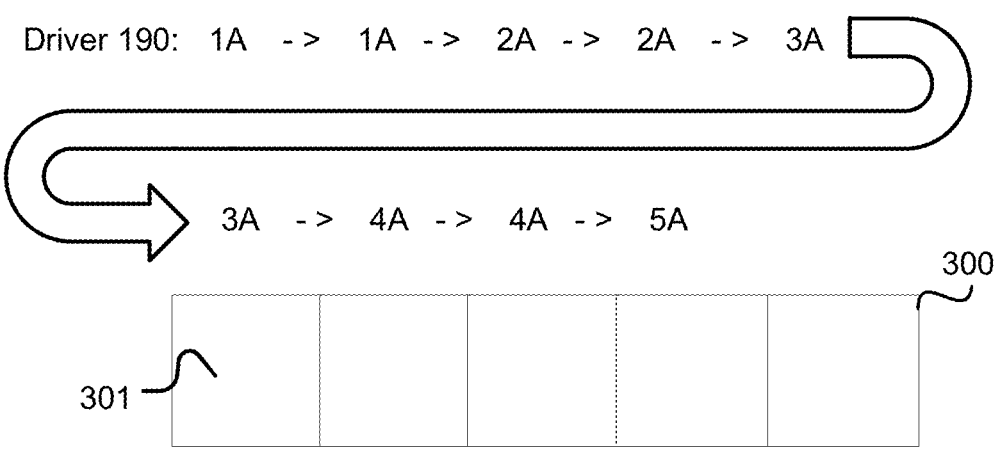
FIG. 4 depicts a block diagram of the descriptor ring structure 300 with skipped descriptors according to one embodiment.
Figure 4:
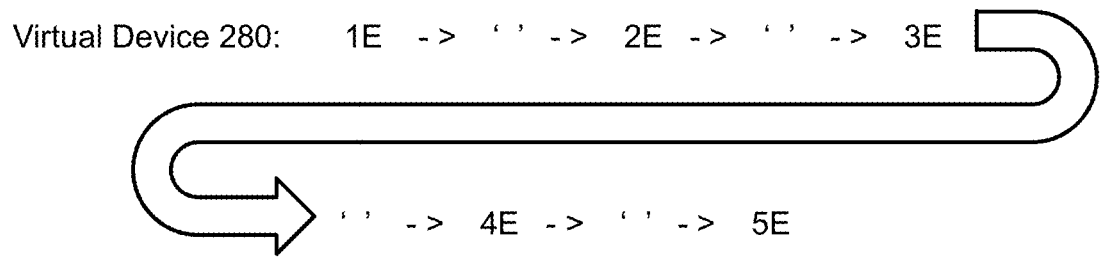

The active and executed descriptors can also be written in sync by skipping some elements from the output of would-be-repeated executed descriptors. FIG. 4 depicts a block diagram of the descriptor ring structure of FIG. 3 with skipped descriptors according to one embodiment. Note that virtual device 280 writes only one executed descriptors for each request. The executed descriptors and its skipped element(s) (e.g., null) have a count equal to the number of the corresponding active descriptors. Thus, the active elements and the executed elements are kept in sync without repeating the executed descriptors. In this case, structure 300 can be discontinuous in memory.

Figure 5A:
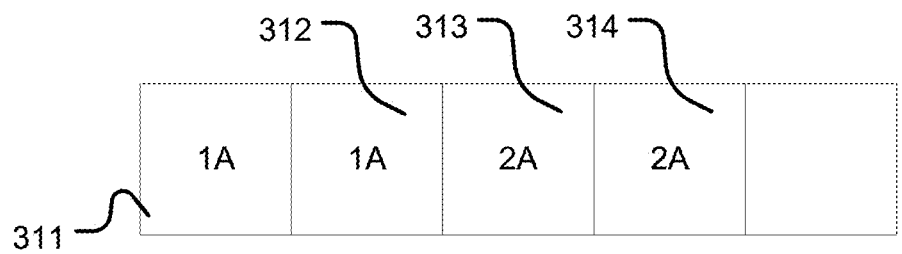
FIGS. 5A-5C depict example contents of the descriptor ring structure of FIGS. 3-4 illustrating repeated descriptors and skipped descriptors.
Figure 5B:
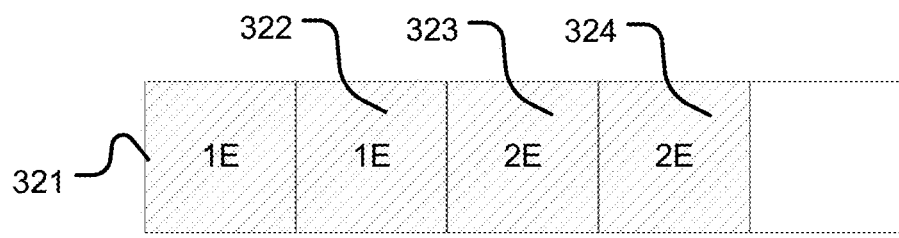
Figure 5C:
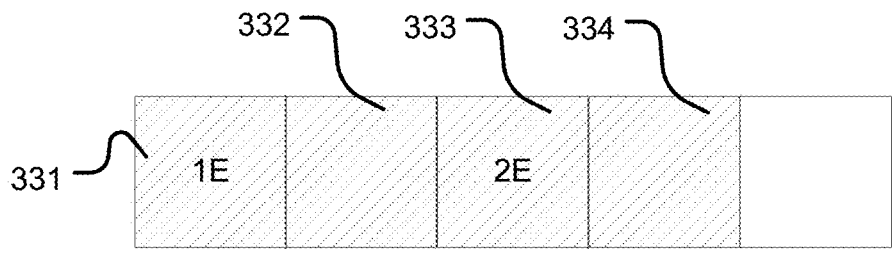

FIGS. 5A-5C depict example contents of the descriptor ring structure of FIGS. 3-4 illustrating repeated and skipped descriptors. As shown in FIG. 5A, at some point in time, structure 300 may have two requests—1A's (active descriptors 311-312 for the first request) and 2A's (active descriptors 313-314 for the second request) queued by driver 190. Driver 190 can use a first index (active_indx) to track where driver 190 is writing in structure 300. The active descriptors 311-314 can be written by driver 190 from the same or separate processes running in guest OS.

Virtual device 280 can read the active descriptors as they are written. Virtual device 280 can track the active descriptors via a read index (similarly to active_idx). Virtual device 280 can write to structure 300 to acknowledge that the active descriptors are processed. Virtual device 280 can use a second index (executed_idx) to track where virtual device 280 is writing in structure 300.

FIG. 5B illustrates repeated executed descriptors. As shown in FIG. 5B, when some of the active descriptors 311-314 are processed by virtual device 280, virtual device 280 writes the executed descriptors, 1E's (executed descriptors 321-322 for the first request) and 2E's (executed descriptors 323-324 for the second request) to structure 300, in the order that the active descriptors 311-314 are processed. Note that the written executed descriptors repeat (e.g., two 1E's) to ensure that the number of active elements equal the number of executed elements to keep the descriptors in sync.

FIG. 5C can illustrate skipped executed descriptors. As shown in FIG. 5C, virtual device 280 can write executed descriptors 331-334 to structure 300 in the order of execution completion. Here, only one executed descriptor (331, 333) are written to structure 300 for each request while remaining elements (332, 334) of the request in the queue are skipped (e.g., null) so that the count of executed elements equals the count of active elements. In one embodiment, the executed descriptor (e.g., 331) is generated by the virtual device using the buffer identifier from the last active descriptor (e.g., 312) in the request. Here, virtual device 280 can keep a count of the active descriptors in each request. In one embodiment, after virtual device 280 writes the executed descriptor to structure 300, virtual device 280 can advance the executed_idx by the count of descriptors in the request. In another embodiment, virtual device 280 advance the executed_idx by the count of a request follow by writing the executed descriptor to structure 300 for the request. Driver 190 can then read the executed descriptor. Skipping some executed descriptors ensures the number of active elements equal the number of executed elements without repeated executed descriptors.

Figure 6:
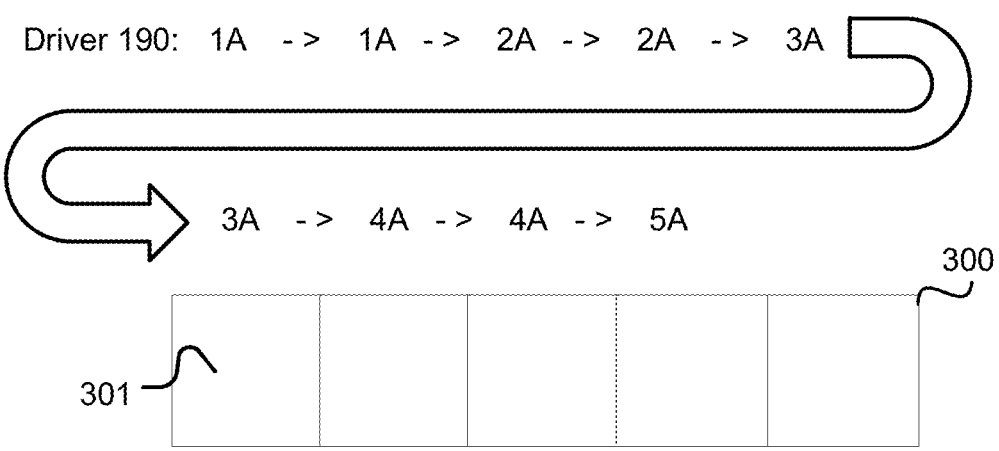
FIG. 6 depicts a block diagram of descriptor ring structure 300 without repeating or skipping descriptors according to one embodiment.
Figure 6:
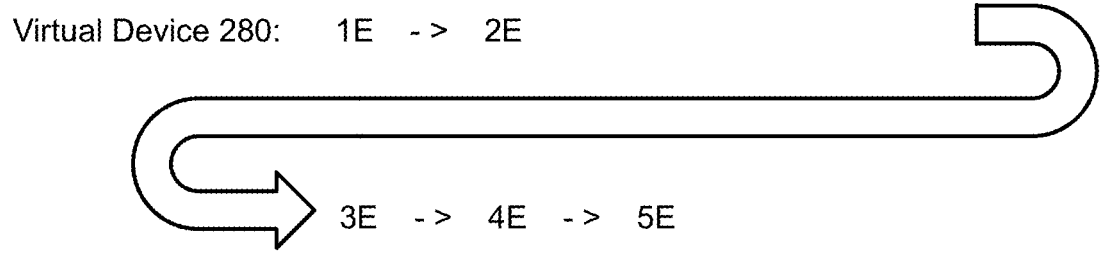

FIG. 6 depicts a block diagram of the descriptor ring structure of FIG. 3 without repeating or skipping descriptors according to one embodiment. As shown in FIG. 6, virtual device 280 writes only one executed descriptor for each request. The executed descriptors for the requests are adjacent to each other and wraps around when virtual device 280 determines that the written active descriptors wrapped around. Here, the writes for the executed descriptors in the queue are not skipped and not repeated, e.g., one executed descriptors is written to the queue for each request, regardless of the number of active descriptors for the request. The executed descriptors are adjacent to each other and continuous in memory until the written executed descriptors wraps around structure 300. This way, a batch of executed descriptors (1E-2E or 3E-5E) is continuous in memory and can prevent small writes when the executed descriptors are communicated over a bus, such as a PCIE bus.

In FIG. 6, to keep the active descriptors and executed descriptors in sync, the virtual device can advance the index (executed_idx) to index 0 (head) of structure 300 when the count for the processed active descriptors is equal to or greater than a synchronization value (e.g., the size of structure 300). To determine when to advance, virtual device 280 can maintain a counter (batch_counter) that counts how many would-be repeated executed descriptors there are. When the counter reaches a synchronization value (e.g., a size of structure 300, size of PCIE packet, etc.), virtual device writes the next executed descriptors to a beginning of structure 300 and the counter is decremented by the synchronization value. This way, the virtual device can advance according to a size of the structure/PCIE packet. Example pseudo code for the virtual device to advance to the head of structure 300 can be:

batch_counter+=num_executed_descriptors
    if batch_counter>ring_size:
        batch_counter-=ring_size
        executed_idx=0, where batch_counter is maintained by virtual device 280 to count the used active descriptors, num_executed_descriptors is the number of would-be executed descriptors if they are repeated (e.g., used active descriptors), ring_size is a size of structure 300 (the synchronization value in this example), and executed_idx is the index maintained by virtual device 280 where virtual device 280 is writing to structure 300.

Figure 7:
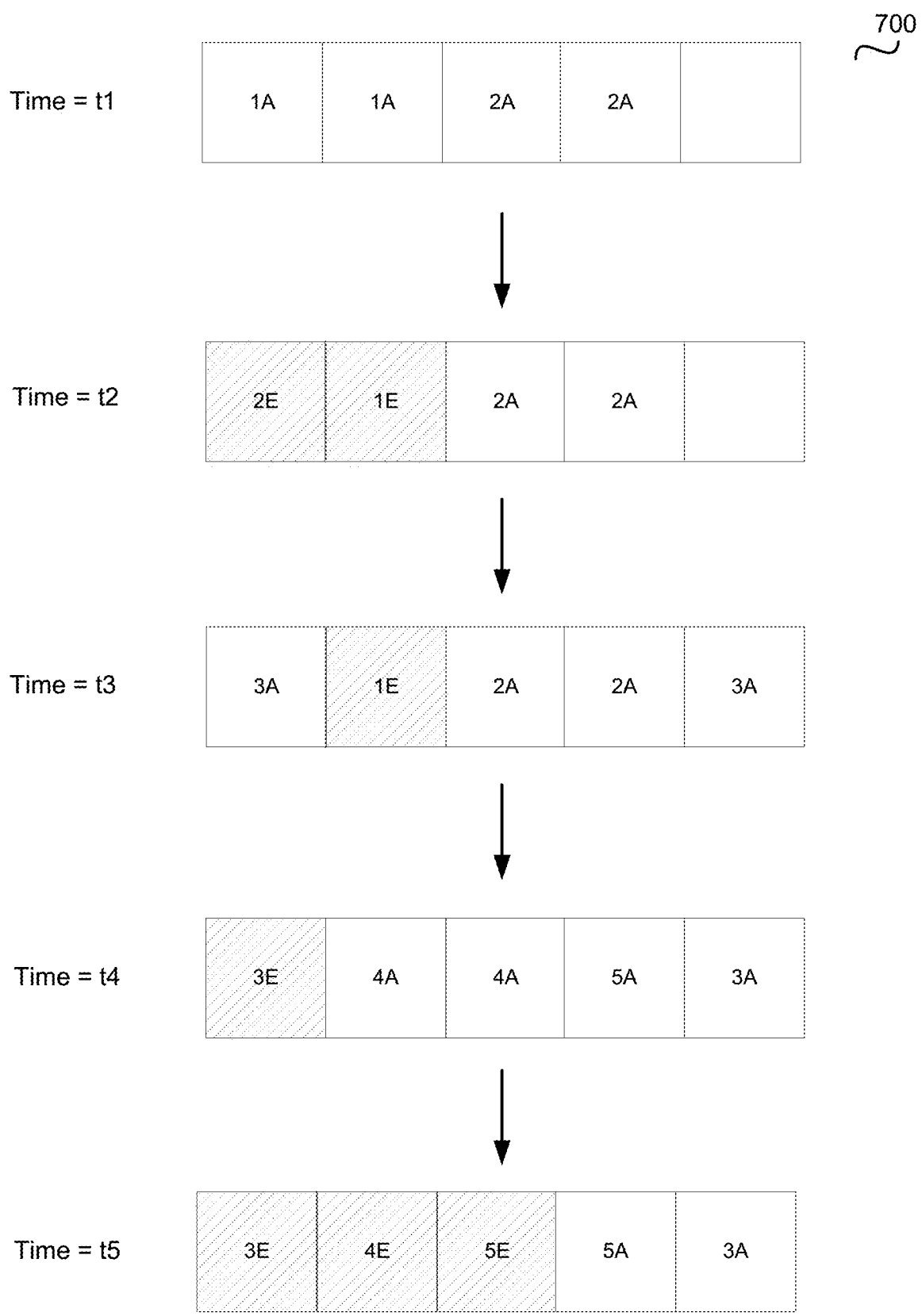
FIG. 7 depicts contents of a descriptor ring structure of FIG. 6 at several time instances according to one embodiment.

FIG. 7 depicts the content of the descriptor ring structure of FIG. 6 at several time instances according to one embodiment. FIG. 7 illustrates five requests having active descriptors 1A-5A as that of FIG. 6. The structures 700 may represent structure 300 of FIG. 6 at different instances in time (t1-t5). Referring to FIG. 7, at time t1, driver 190 can write active descriptors 1A-2A for two requests using a first index (active_idx), where active_idx advances by one element after each write.

Virtual device 280 can read the active descriptors 1A-2A for the two requests in the order they are written. In one embodiment, virtual device 280 polls structure 700 to monitor for any new active descriptors. In another embodiment, driver 190 notifies virtual device 280 (via control path 203 of FIG. 2) for new active descriptors. Virtual device 280 then processes the active descriptors as they are being read. At time t2, virtual device 280 may have processed the active descriptors and writes 2E and 1E using a second index (executed_idx), where executed_idx advances by one element after each write. In this case, request number 2 associated with 2A's is completed before request number 1, e.g., out of order. In one embodiment, virtual device 280 stores a list of to-be-processed active descriptors in memory as virtual device 280 reads the active descriptors in structure 700.

At time t3, driver 190 writes a first active descriptor 3A using active_idx and active_idx wraps around to a head of structure 300. Driver 190 writes the second active descriptor 3A using active_idx overwriting 1E.

At time t4, driver 190 writes 4A's and 5A using active_idx. Driver 190 writes a first 4A over 2E. Driver 190 writes a second 4A and the 5A over a previous active descriptor. Note that driver 190 can overwrite executed descriptors and driver 190 can overwrite active descriptors for the second half of structure 700.

Virtual device 280 may have executed request number 3. Virtual device 280 can maintain a counter for the used active descriptors. Virtual device 280 can determine that the counter reached a value of 6 (2-1A, 2-2A, 2-3A). Because the counter is greater than or equal to 5 (synchronization value equal to the size of structure 700 in this example), virtual device 280 sets executed_idx to an initial position and decrements the counter by 5 (size of structure 700). Virtual device writes 3E using executed_idx.

At time t5, virtual device 280 may have executed request numbers 4-5 and writes 4E-5E using executed_idx.

Reviewing the contents in structure 700 at any time instances, the active/executed descriptors are continuous in memory and the executed descriptors are not repeated. The continuous descriptors prevents small writes when the descriptors are communication across a bus, e.g., a PCIE bus.

Figure 8:
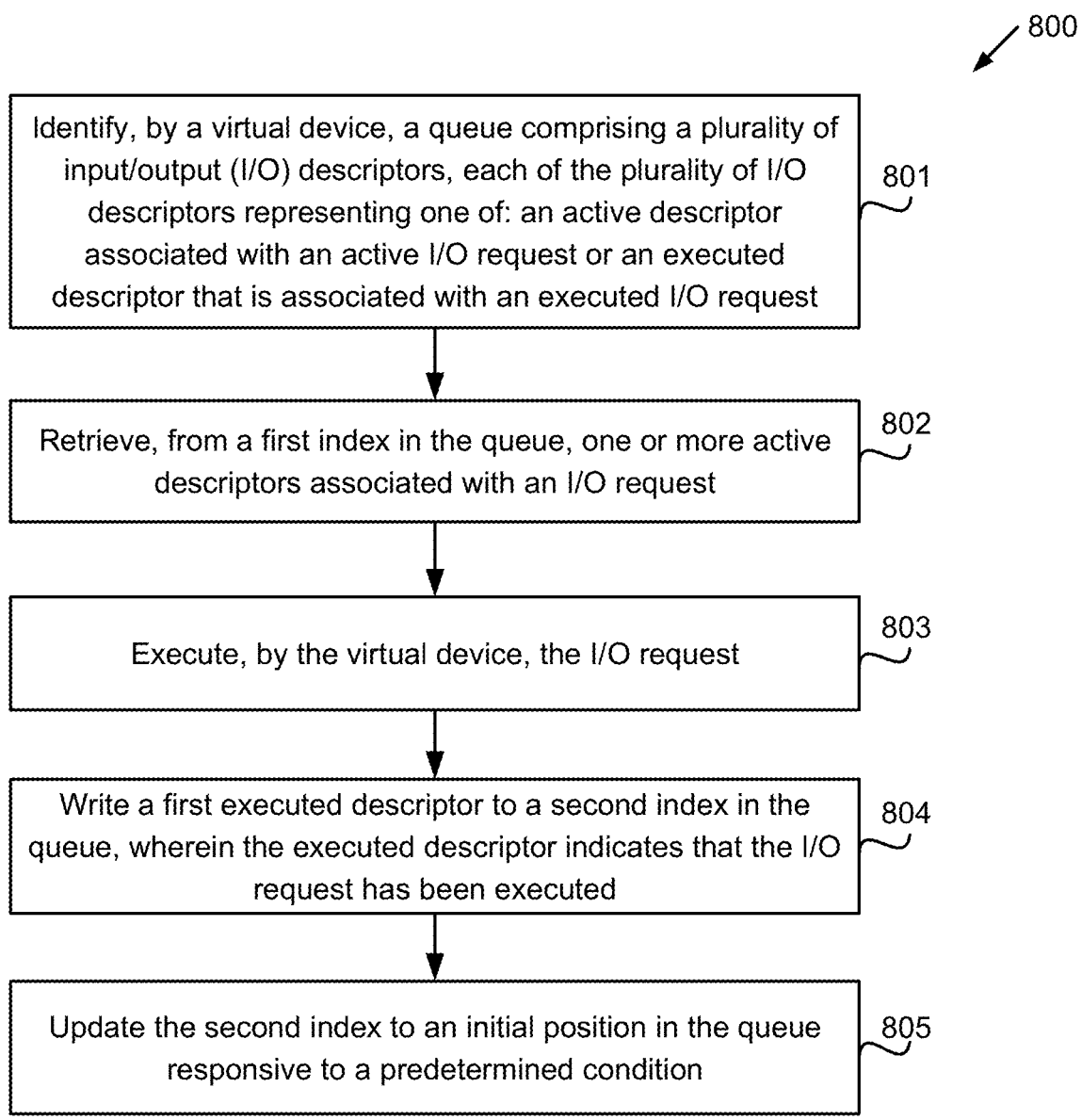
FIG. 8 depicts a flow diagram of a method for I/O communication according to one embodiment.

FIG. 8 depicts a flow diagram of a method for I/O communication according to one embodiment. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 8 can be performed simultaneously or in a different order than that depicted.

At block 801, processing logic identifies a queue (e.g., structure 300 of FIG. 3 or structure 700 of FIG. 7) comprising a plurality of input/output (I/O) descriptors, each of the plurality of I/O descriptors representing one of: an active descriptor associated with an active I/O request or an executed descriptor that is associated with an executed I/O request.

At block 802, processing logic retrieves, from a first index (active_idx) in the queue, one or more active descriptors associated with an I/O request. Processing logic can poll the queue for active descriptors or retrieve the active descriptors responsive to receiving a notification via an interrupt from driver 190.

At block 803, processing logic retrieves data from the memory buffer(s) described by the descriptors and executes the I/O request from data in the memory buffer(s).

At block 804, processing logic writes a first executed descriptor to a second index in the queue, wherein the first executed descriptor indicates the I/O request has been executed.

At block 805, processing logic updates the second index to an initial position in the queue responsive to a predetermined condition. Here, the predetermined condition includes: the virtual device has processed an active descriptor in a last position in the queue.

The size of the queue can be equal to a size of a PCI express packet. Processing logic can further maintain a list of active descriptors corresponding to requests yet to be executed. The driver can write the active descriptors for the request to execute one or more operations (store packet, send packet, etc.) by the physical device associated with the virtual device.

Responsive to writing an active descriptor, the driver can send a notification to the virtual device to notify that an active descriptor is available to be processed. The driver can operate within a kernel space of a virtual machine.

Figure 9:
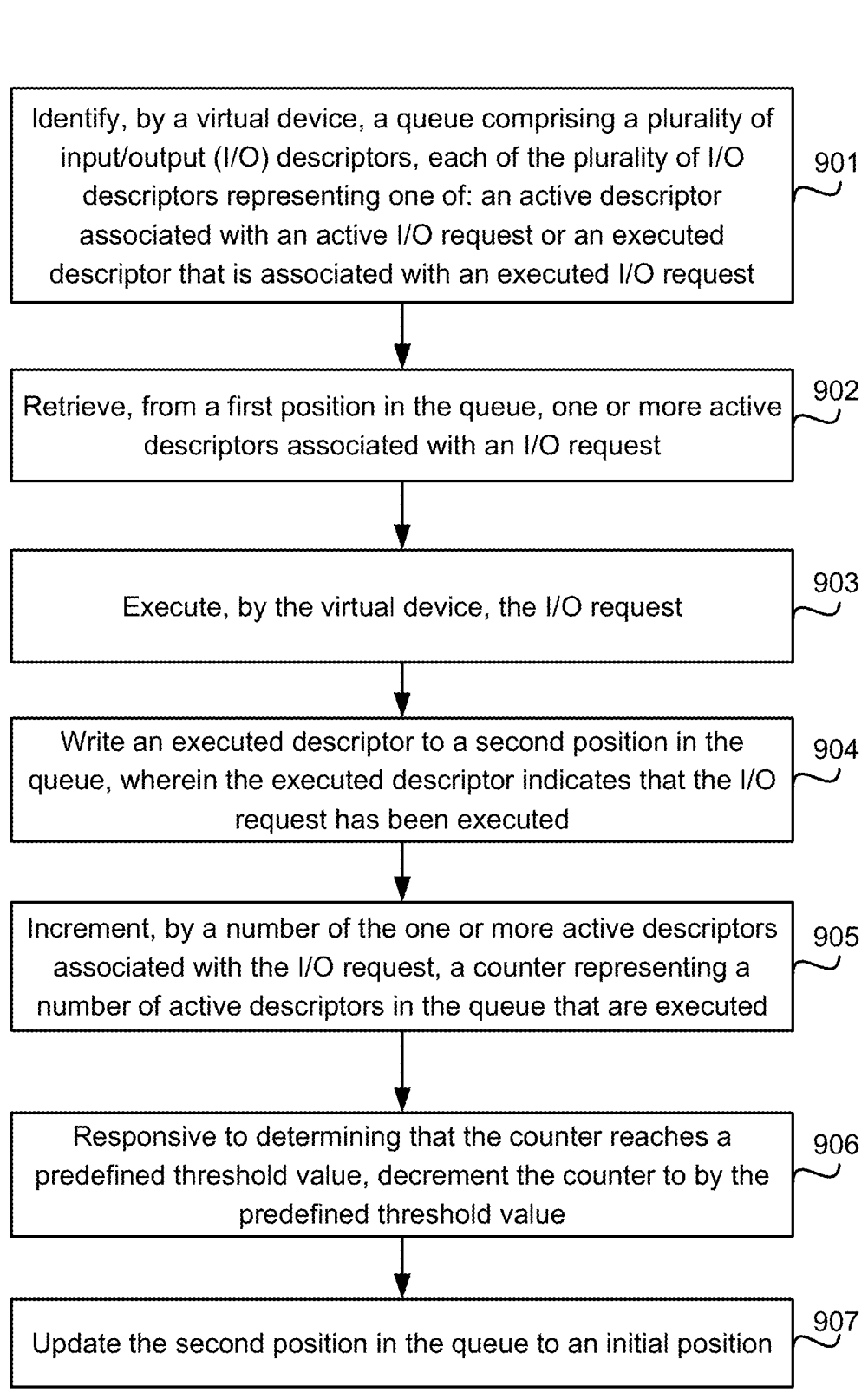
FIG. 9 depicts a flow diagram of a method for I/O communication according to another embodiment.

FIG. 9 depicts a flow diagram of a method for I/O communication according to one embodiment. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 9 can be performed simultaneously or in a different order than that depicted.

At block 901, processing logic identifies a queue (e.g., structure 300 of FIG. 3 or structure 700 of FIG. 7) comprising a plurality of input/output (I/O) descriptors, each of the plurality of I/O descriptors representing one of: an active descriptor associated with an active I/O request or an executed descriptor that is associated with an executed I/O request.

At block 902, processing logic retrieves, from a first position (active_idx) in the queue, one or more active descriptors associated with an I/O request. Processing logic can poll the queue for active descriptors or retrieve the active descriptors responsive to receiving a notification via an interrupt from driver 190.

At block 903, processing logic retrieves data from the memory buffer(s) described by the descriptors and executes the I/O request.

At block 904, processing logic writes an executed descriptor to a second position (executed_idx) in the queue, wherein the executed descriptor indicates that the I/O request has been executed.

At block 905, processing logic increments, by a number of the one or more active descriptors associated with the I/O request, a counter (batch_counter) representing a number of active descriptors in the queue that are executed.

At block 906, responsive to determining that the counter reaches a predefined threshold value (synchronization value), processing logic decrements the counter to by the predefined threshold value.

At block 907, processing logic updates the second position in the queue to an initial position (executed_idx resets to point to the head of the queue).

The predefined threshold value can include a size of the queue or a size of a PCI express packet. Processing logic can further maintain a list of active descriptors corresponding to requests yet to be executed. The driver can write the active descriptors for the request to execute one or more operations (store packet, send packet, etc.) by the physical device associated with the virtual device.

Responsive to writing an active descriptor, the driver can send a notification to the virtual device to notify that an active descriptor is available to be processed. The driver can operate within a kernel space of a virtual machine.

Figure 10:
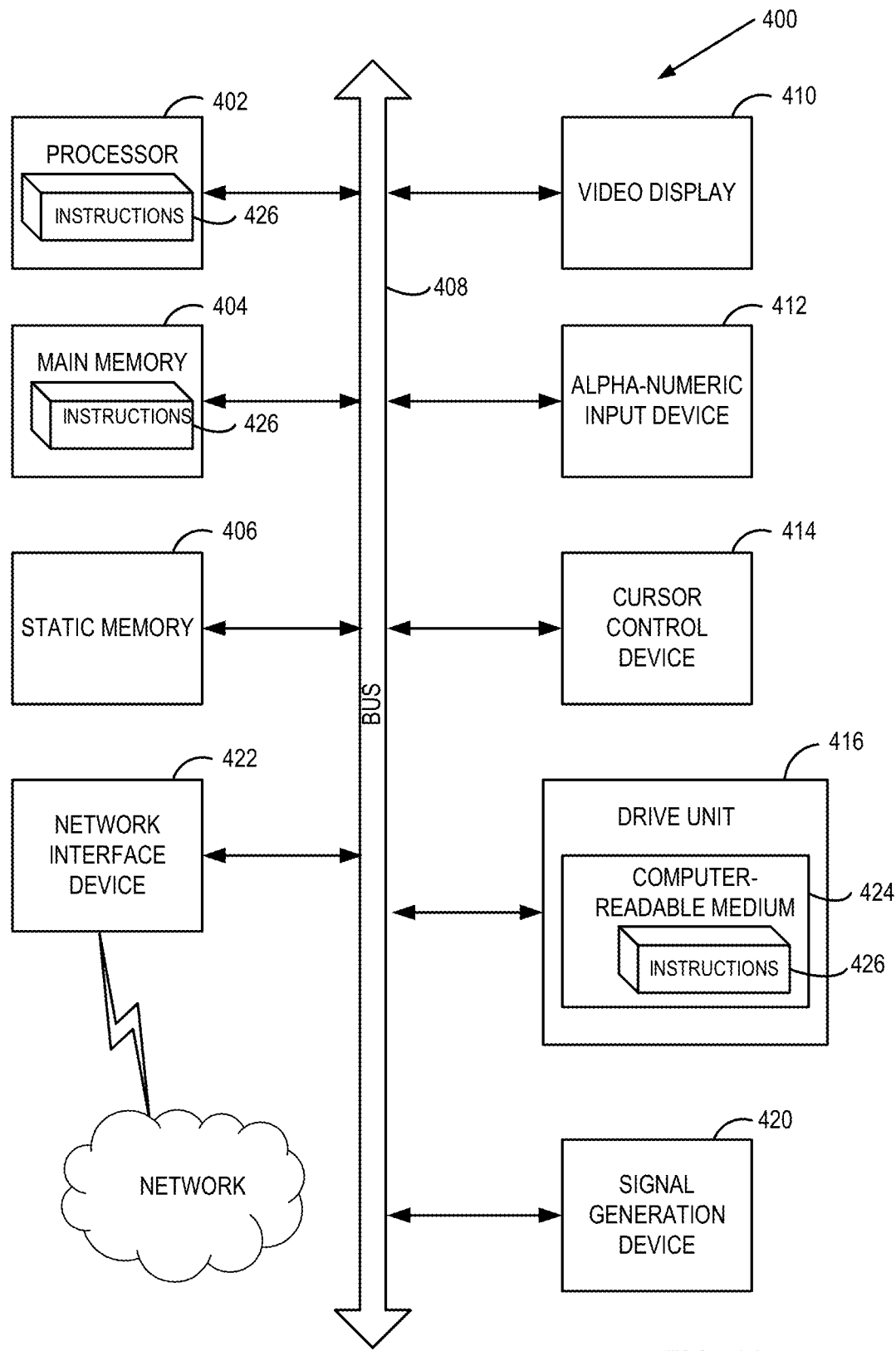
FIG. 10 depicts a block diagram of an illustrative computer system operating in accordance with embodiments of the invention.

FIG. 10 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 8 or FIG. 9, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a system, comprising: a memory; and a processing device, coupled to the memory, the processing device to:

identify, by a virtual device, a queue comprising a plurality of input/output (I/O) descriptors, each of the plurality of I/O descriptors representing one of: an active descriptor associated with an active I/O request or an executed descriptor that is associated with an executed I/O request;

retrieve, from a first index in the queue, one or more active descriptors associated with an I/O request;

execute, by the virtual device, the I/O request;

write a first executed descriptor to a queue position identified by a second index, wherein the first executed descriptor indicates the I/O request has been executed; and update the second index to an initial position in the queue responsive to determining that a predetermined condition is satisfied.

Example 2 is a system of example 1, wherein determining that the predetermined condition is satisfied further comprises: the virtual device has processed an active descriptor in a last position in the queue.

Example 3 is a system of example 1, wherein the size of the queue is equal to a size of a PCI express packet.

Example 4 is a system of example 1, wherein the processing device is further to: maintain, by the virtual device, a list of active descriptors corresponding to pending requests.

Example 5 is a system of example 1, wherein the processing device is further to: write, by a driver, the active descriptors for the request to execute one or more operations by the physical device associated with the virtual device.

Example 6 is a system of example 1, wherein the processing device is further to: responsive to writing an active descriptor, send, by a driver, a notification to the virtual device to notify that an active descriptor is available to be processed.

Example 7 is a system of example 6, wherein the driver operates within a kernel space of a virtual machine.

Example 8 is a method, comprising:

identifying, by a virtual device, a queue comprising a plurality of input/output (I/O) descriptors, each of the plurality of I/O descriptors representing one of: an active descriptor associated with an active I/O request or an executed descriptor that is associated with an executed I/O request;

retrieving, from a first position in the queue, one or more active descriptors associated with an I/O request;

executing, by the virtual device, the I/O request;

writing an executed descriptor to a second position in the queue, wherein the executed descriptor indicates that the I/O request has been executed;

incrementing, by a number of the one or more active descriptors associated with the I/O request, a counter representing a number of active descriptors in the queue that are executed;

responsive to determining that the counter reaches a predefined threshold value, decrementing the counter to by the predefined threshold value; and updating the second position in the queue to an initial position.

Example 9 is a method of example 8, wherein the predefined threshold value includes a size of the queue or a size of a PCI express packet.

Example 10 is a method of example 8, further comprising maintaining, by the virtual device, a list of active descriptors corresponding to requests yet to be executed.

Example 11 is a method of example 8, further comprising: writing, by a driver, the active descriptors for the request to execute one or more operations by the physical device associated with the virtual device.

Example 12 is a method of example 8, further comprising: responsive to writing at a last position in the queue, writing, by a driver, a next active descriptor to the initial position in the queue.

Example 13 is a method of example 8, further comprising: responsive to writing an active descriptor, sending, by a driver, a notification to the virtual device to notify that an active descriptor is available to be processed.

Example 14 is a method of example 13, wherein the driver operates within a kernel space of a virtual machine.

Example 15 is a non-transitory machine-readable storage medium including instructions that, when executed by a processing device, cause the processing device to:

identify, by a virtual device, a queue comprising a plurality of input/output (I/O) descriptors, each of the plurality of I/O descriptors representing one of: an active descriptor associated with an active I/O request or an executed descriptor that is associated with an executed I/O request;

retrieve, from a first index in the queue, one or more active descriptors associated with an I/O request;

execute, by the virtual device, the I/O request;

write a first executed descriptor to a second index in the queue, wherein the first executed descriptor indicates the I/O request has been executed; and update the second index to an initial position in the queue responsive to a predetermined condition.

Example 16 is a non-transitory machine-readable storage medium of example 15, wherein the predetermined condition comprises: the virtual device has processed an active descriptor in a last position in the queue.

Example 17 is a non-transitory machine-readable storage medium of example 15, wherein the size of the queue is equal to a size of a PCI express packet.

Example 18 is a non-transitory machine-readable storage medium of example 15, wherein the processing device is further to: maintain, by the virtual device, a list of active descriptors corresponding to requests yet to be executed.

Example 19 is a non-transitory machine-readable storage medium of example 15, wherein the processing device is further to: write, by a driver, the active descriptors for the request to execute one or more operations by the physical device associated with the virtual device.

Example 20 is a non-transitory machine-readable storage medium of example 155, wherein the processing device is further to: responsive to writing an active descriptor, send, by a driver, a notification to the virtual device to notify that an active descriptor is available to be processed.

Example 21 is an apparatus comprising: a means for identifying, by a virtual device, a queue comprising a plurality of input/output (I/O) descriptors, each of the plurality of I/O descriptors representing one of: an active descriptor associated with an active I/O request or an executed descriptor that is associated with an executed I/O request;

a means for retrieving, from a first position in the queue, one or more active descriptors associated with an I/O request;

a means for executing, by the virtual device, the I/O request;

a means for writing an executed descriptor to a second position in the queue, wherein the executed descriptor indicates that the I/O request has been executed;

a means for incrementing, by a number of the one or more active descriptors associated with the I/O request, a counter representing a number of active descriptors in the queue that are executed;

a means for responsive to determining that the counter reaches a predefined threshold value, decrementing the counter to by the predefined threshold value; and a means for updating the second position in the queue to an initial position.

Example 22 is an apparatus of example 21, wherein the predefined threshold value includes a size of the queue or a size of a PCI express packet.

Example 23 is an apparatus of example 21, further comprising a means for maintaining, by the virtual device, a list of active descriptors corresponding to requests yet to be executed.

Example 24 is an apparatus of example 21, further comprising a means for writing, by a driver, the active descriptors for the request to execute one or more operations by the physical device associated with the virtual device.

Example 25 is an apparatus of example 21, further comprising: responsive to writing at a last position in the queue, a means for writing, by a driver, a next active descriptor to the initial position in the queue.

Example 26 is an apparatus of example 21, further comprising: responsive to writing an active descriptor, a means for sending, by a driver, a notification to the virtual device to notify that an active descriptor is available to be processed.

Example 27 is an apparatus of example 26, wherein the driver operates within a kernel space of a virtual machine.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system, comprising:
a memory; and
a processing device, coupled to the memory, the processing device to:
identify, by a virtual device, a queue comprising a plurality of input/output (I/O) descriptors, each of the plurality of I/O descriptors representing one of: an active descriptor associated with an active I/O request or an executed descriptor that is associated with an executed I/O request;
retrieve, from a first index in the queue, one or more active descriptors associated with an I/O request;
execute, by the virtual device, the I/O request;
write a first executed descriptor to a queue position identified by a second index, wherein the first executed descriptor indicates the I/O request has been executed; and
update the second index to an initial position in the queue responsive to determining that a predetermined condition is satisfied.

2. The system of claim 1, wherein to determine that the predetermined condition is satisfied, the processing device is further to:
determining that the virtual device has processed an active descriptor in a last position in the queue.

3. The system of claim 1, wherein the size of the queue is equal to a size of a PCI express packet.

4. The system of claim 1, wherein the processing device is further to: maintain, by the virtual device, a list of active descriptors corresponding to pending requests.

5. The system of claim 1, wherein the processing device is further to: write, by a driver, the active descriptors for the request to execute one or more operations by the physical device associated with the virtual device.

6. The system of claim 1, wherein the processing device is further to:
responsive to writing an active descriptor, send, by a driver, a notification to the virtual device to notify that the active descriptor is available to be processed.

7. The system of claim 6, wherein the driver operates within a kernel space of a virtual machine.

8. A method, comprising:
identifying, by a virtual device, a queue comprising a plurality of input/output (I/O) descriptors, each of the plurality of I/O descriptors representing one of: an active descriptor associated with an active I/O request or an executed descriptor that is associated with an executed I/O request;
retrieving, from a first position in the queue, one or more active descriptors associated with an I/O request;
executing, by the virtual device, the I/O request;
writing an executed descriptor to a second position in the queue, wherein the executed descriptor indicates that the I/O request has been executed;
incrementing, by a number of the one or more active descriptors associated with the I/O request, a counter representing a number of active descriptors in the queue that are executed;
responsive to determining that the counter reaches a predefined threshold value, decrementing the counter by the predefined threshold value; and
updating the second position in the queue to an initial position.

9. The method of claim 8, wherein the predefined threshold value includes a size of the queue or a size of a PCI express packet.

10. The method of claim 8, further comprising:
maintaining, by the virtual device, a list of active descriptors corresponding to requests yet to be executed.

11. The method of claim 8, further comprising: writing, by a driver, the active descriptors for the request to execute one or more operations by the physical device associated with the virtual device.

12. The method of claim 8, further comprising: responsive to writing at a last position in the queue, writing, by a driver, a next active descriptor to the initial position in the queue.

13. The method of claim 8, further comprising:
responsive to writing an active descriptor, sending, by a driver, a notification to the virtual device to notify that the active descriptor is available to be processed.

14. The method of claim 13, wherein the driver operates within a kernel space of a virtual machine.

15. A non-transitory machine-readable storage medium including instructions that, when executed by a processing device, cause the processing device to:
identify, by a virtual device, a queue comprising a plurality of input/output (I/O) descriptors, each of the plurality of I/O descriptors representing one of: an active descriptor associated with an active I/O request or an executed descriptor that is associated with an executed I/O request;
retrieve, from a first index in the queue, one or more active descriptors associated with an I/O request;
execute, by the virtual device, the I/O request;
write a first executed descriptor to a second index in the queue, wherein the first executed descriptor indicates the I/O request has been executed; and
update the second index to an initial position in the queue responsive to a predetermined condition.

16. The non-transitory machine-readable storage medium of claim 15, wherein the predetermined condition comprises: a determination that the virtual device has processed an active descriptor in a last position in the queue.

17. The non-transitory machine-readable storage medium of claim 15, wherein the size of the queue is equal to a size of a PCI express packet.

18. The non-transitory machine-readable storage medium of claim 15, wherein the processing device is further to: maintain, by the virtual device, a list of active descriptors corresponding to requests yet to be executed.

19. The non-transitory machine-readable storage medium of claim 15, wherein the processing device is further to: write, by a driver, the active descriptors for the request to execute one or more operations by the physical device associated with the virtual device.

20. The non-transitory machine-readable storage medium of claim 15, wherein the processing device is further to:
responsive to writing an active descriptor, send, by a driver, a notification to the virtual device to notify that the active descriptor is available to be processed.

* * * * *